W. G. JACKSON.
ANIMAL TRAP.
APPLICATION FILED OCT. 11, 1911.

1,024,782.

Patented Apr. 30, 1912.

WITNESSES
F. C. Fliedner
H. B. Keating

INVENTOR
W. G. Jackson,
BY J. M. Wright
ATTORNEY

UNITED STATES PATENT OFFICE.

WILLIAM G. JACKSON, OF SANTA ROSA, CALIFORNIA.

ANIMAL-TRAP.

1,024,782. Specification of Letters Patent. Patented Apr. 30, 1912.

Application filed October 11, 1911. Serial No. 654,147.

*To all whom it may concern:*

Be it known that I, WILLIAM G. JACKSON, a citizen of the United States, residing at Santa Rosa, in the county of Sonoma and State of California, have invented new and useful Improvements in Animal-Traps, of which the following is a specification.

The present invention relates to improvements in animal traps, especially intended for catching rats, mice, and other small animals, the object of the invention being to provide a trap of this character which will be more effective and certain in its action than those heretofore devised.

Traps for catching such animals, provided with a trap door over which the animal is induced to walk, and which is tilted to precipitate the animal into a receptacle below, have been heretofore constructed so that said tilting is effected, either by the over-balancing of said door by the mere weight of the animal walking over it, or by retaining said door in position by means of a trigger, attached to bait, which, being pulled by the animal, causes the trigger to move and releases the trap door. Both of these methods have been only partly successful. When the trap door is tilted by the mere walking of the animal thereover, it is in many cases ineffective, for, if the animal passes the point, at which its weight exactly balances the door, slowly and cautiously, it immediately feels a slight movement or vibration, which at first is so slow that it has ample time to retreat which it instinctively does. The other method, of attaching a bait to a trigger, so that it requires a pull by the animal upon the bait to withdraw the trigger and release the trap door, is also found ineffective, for two reasons, first, in practice it is necessary to employ a steel wire to attach the bait and the close presence of this metal to the bait imparts to the animal a sense of danger, and, second, it is often found that an animal, by cautiously nibbling at the bait, can remove the entire bait without giving a sufficiently strong pull to the trigger to actuate the trap.

The object of my invention is to provide a trap which will give no preliminary warning to the animal before it takes effect, and the operation of which will not be dependent upon the pulling by the animal on a bait set for that purpose.

Figure 1:
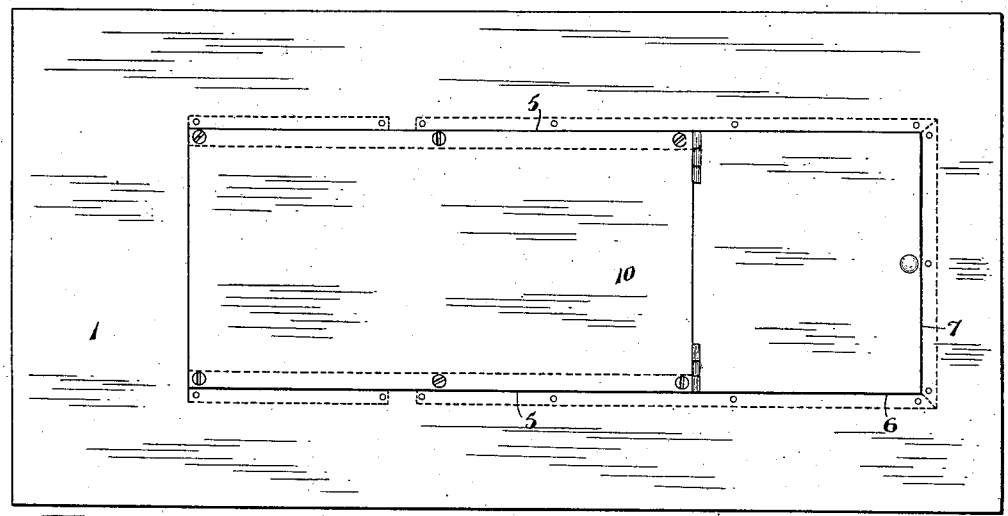
Figure 2:
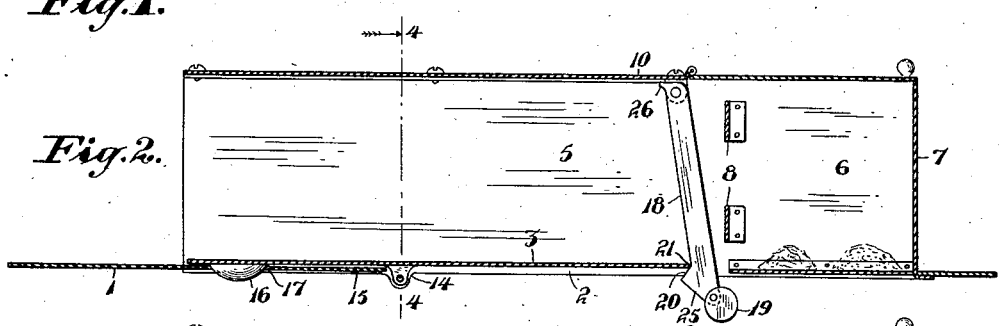
Figure 3:
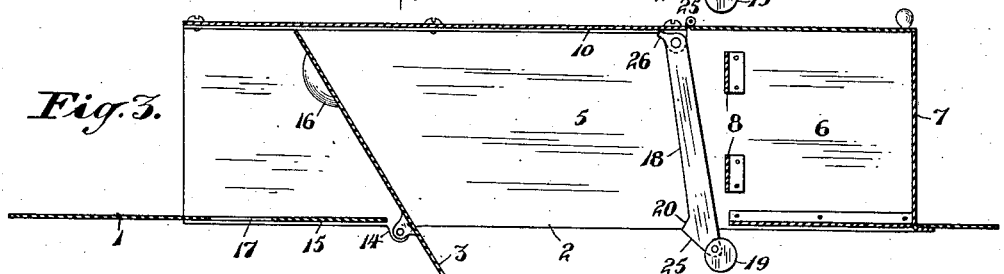
Figure 4:
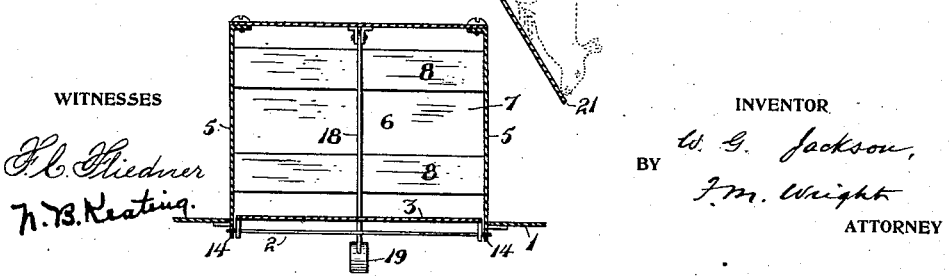

In the accompanying drawing, Figure 1 is a plan view of my improved trap; Fig. 2 is a longitudinal vertical section of the trap, as set; Fig. 3 is a similar view showing the parts in position in which an animal is being caught; Fig. 4 is a cross sectional view on the line 4—4 of Fig. 2.

Referring to the drawing, 1 indicates a suitable base having an opening 2 in which is hinged a trap door 3. Said base will form the top of a receptacle, which may be either a closed box, a barrel containing water, or any other suitable receptacle. At the longitudinal sides of said opening 2, there are erected, upon the base 1, longitudinal walls 5, which extend beyond said opening to a considerable distance, to form the side walls of a bait chamber 6, and are connected at the ends by a transverse wall 7, bars 8 extending between said side walls at the front portion of the bait chamber.

The door 3 is pivoted in bearings 14 in the base, the front portion of the door, extending in front of said bearings, being of greater length than the rear portion. Said front portion can swing downwardly through the opening in the base, while the rear portion normally rests upon a support 15. The rear portion of the door is weighted on its under side, as shown at 16, and the support is formed with a hole 17 to receive said weight, so that, except when the weight of an animal is added to the weight of the front portion, said door remains in its horizontal position. Even when said weight is so added, and the total weight on the front side of the bearings 14 exceeds that on the rear side, the door is maintained in the horizontal position by means of a trigger 18, suitably weighted, as shown at 19, and pivoted to the top 10, and having a portion 20 of its front edge beveled to engage the front edge 21 of the door and so support it in the horizontal position. But when a rat or other animal, having entered the passageway between the side walls 5 and approaching the bait chamber moves to a sufficient distance in front of the pivotal axis of the door, then the increased leverage overcomes the weight of the trigger and the friction therewith, and causes the trigger to swing away from the front edge of the door. But when said trigger so swings an extremely short distance, so that the front portion of the door is no longer supported by the trigger, said front portion then drops very rapidly, and the animal is precipitated in the receptacle below. Moreover, by reason of the rear portion of the door at the same time rising between the side walls 5, the animal's retreat is cut off. For these reasons the trap is very effective. If the device is intended for the capture of small animals, as mice, the weights 16 and 19 are small, but if for the capture of larger animals as rats heavy weights 16 and 19 are used. The lower portion of the trigger, below the beveled part 20 is also beveled, as shown at 25, to permit the trigger to be readily moved back by the door, when the latter returns to its normal or operative position. The forward swinging movement of the trigger is limited by a nose 26 thereon which engages the under side of the top 10.

I claim:—

1. In an animal trap, a base having an opening therethrough, a trap door pivotally connected to said base to swing on a transverse axis dividing the door into unequal parts, the longer part extending over and being adapted to swing through said opening, a support for the shorter part of the door, the portion of the door extending over said support being heavier than that extending over said opening, walls on said base at the longitudinal sides of said opening, said longitudinal walls also extending along the longitudinal sides of said support, walls forming a bait chamber on said base in line with said door, the interior of said chamber being visible to an animal on said door, a top on said longitudinal walls, and a trigger pivotally supported at the top, and having a portion of its front edge beveled to engage the door, the angle of the bevel being such that, upon sufficient downward pressure on the door, said trigger is pushed away from said door.

2. In an animal trap, a base having an opening therethrough, a trap door pivotally connected to said base to swing on a transverse axis dividing the door into unequal parts, the longer part extending over and being adapted to swing through said opening, a support for the shorter part of the door, the portion of the door extending over said support being heavier than that extending over said opening, walls on said base at the longitudinal sides of said opening, said longitudinal walls also extending along the longitudinal sides of said support, walls forming a bait chamber on said base in line with said door, the interior of said chamber being visible to an animal on said door, a top on said longitudinal walls, and a trigger pivotally supported at the top, and having a portion of its front edge beveled to engage the door, the angle of the bevel being such that, upon sufficient downward pressure on the door, said trigger is pushed away from said door, the lower portion of the trigger, below said beveled edge, being suitably beveled to permit said downwardly swinging portion of the door to return to its original position.

3. In an animal trap, a floor having an opening therethrough, a trap door pivotally connected to said floor so that a portion of said door extends over and is adapted to swing through said opening, a movable support for an edge of said portion remote from said pivot, means for resisting the movement of said support, said support having a beveled surface upon which said edge rests, the angle of the bevel being such that, upon sufficient downward pressure on the door, said support is moved away from said edge against the resistance of said means, and means for supporting a bait in sight of an animal moving on said door from said pivot toward said edge.

In testimony whereof I have hereunto set my hand in the presence of two subscribing witnesses.

WILLIAM G. JACKSON.

Witnesses:
F. M. WRIGHT,
D. B. RICHARDS.

---

Copies of this patent may be obtained for five cents each, by addressing the "Commissioner of Patents, Washington, D. C."